United States Patent [19]

Waddill

[11] Patent Number: 4,835,241

[45] Date of Patent: * May 30, 1989

[54] EPOXY COATINGS USING ACRYLATE ESTERS, POLYETHERPOLYAMINES AND PIPERAZINE(S)

[75] Inventor: Harold G. Waddill, Austin, Tex.

[73] Assignee: Texaco Inc., White Plains, N.Y.

[*] Notice: The portion of the term of this patent subsequent to Aug. 23, 2005 has been disclaimed.

[21] Appl. No.: 92,856

[22] Filed: Sep. 3, 1987

Related U.S. Application Data

[63] Continuation-in-part of Ser. No. 67,074, Jun. 29, 1987.

[51] Int. Cl.[4] .............................................. C08G 59/42
[52] U.S. Cl. .................................... 528/111; 525/504; 525/532; 528/341
[58] Field of Search ................. 528/111, 341; 525/504

[56] References Cited

U.S. PATENT DOCUMENTS

| | | | |
|---|---|---|---|
| 3,875,072 | 4/1975 | Wadill | 528/111 |
| 4,051,195 | 9/1977 | McWhorter | 528/106 |
| 4,189,564 | 2/1980 | Waddill | 528/94 |
| 4,195,153 | 3/1980 | Waddill | 528/94 |
| 4,383,090 | 5/1983 | Slocki et al. | 528/109 |
| 4,487,805 | 12/1984 | Sellstrom | 428/413 |
| 4,528,345 | 7/1985 | Waddill | 525/523 |
| 4,588,788 | 5/1986 | Emmons et al. | 525/531 |

Primary Examiner—Earl Nielsen
Assistant Examiner—Frederick F. Krass
Attorney, Agent, or Firm—Jack H. Park; Kenneth R. Priem; Richard A. Morgan

[57] ABSTRACT

The invention is an epoxy resin coating composition. The composition comprises:
1. a bisphenol A resin, and
2. an acrylate ester, reacted with a mixture of
3. a polyether polyamine of the formula:
   a. $NH_2CH(CH_3)CH_2[OCH_2CH(CH_3)]_xNH_2$
      wherein x ranges from 2 to 6, or
   b.

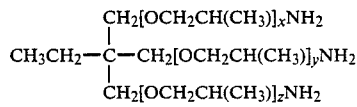

wherein $x+y+z$ ranges from 4 to 6; and
4. piperazine.

The weather resistant formulations cure rapidly to form attractive blemish-free, blush-free coatings.

18 Claims, No Drawings

EPOXY COATINGS USING ACRYLATE ESTERS, POLYETHERPOLYAMINES AND PIPERAZINE(S)

CROSS-REFERENCE TO RELATED APPLICATION

This application is a continuation-in-part of application Ser. No. 067,074 filed June 29, 1987, titled Rapid Curing Weather Resistant Epoxy Coatings to H. G. Waddill.

This application is also related to a patent application Ser. No. 07/092,855, now U.S. Pat. No. 4,766,186 filed on even date titled Epoxy Adhesive to K. B. Sellstrom and H. G. Waddill.

BACKGROUND OF THE INVENTION

1. Field of the Invention

The invention relates to rapid curing, blemish-free epoxy coatings.

2. Description of Other Relevant Materials in the Field

Epoxy resins constitute a broad class of polymeric materials having a wide range of physical characteristics. The resins are characterized by epoxide groups which are cured by reaction with catalysts or curing agents to provide cured epoxy resin compositions with certain desirable properties.

U.S. Pat. No. 4,051,195 to W. F. McWhorter teaches curable epoxy resin compositions comprising (1) a blend of an epoxide resin and a polyacrylate or polymethacrylate ester of a polyol wherein the ester contains more than one terminal acrylate or methacrylate and (2) an aliphatic polyamine curing agent. The weight ratio of epoxide resin: ester is 100:5 to 100:100. The aliphatic polyamine is incorporated into the resin composition in a specified amount. The epoxy resin compositions are said to cure rapidly even at low temperature and are useful as coatings and adhesives.

U.S. Pat. No. 4,528,345 to H. G. Waddill teaches a method for making weather-resistant epoxy coatings. The method comprises prereacting a cycloaliphatic diepoxide resin with aminoethylpiperazine or a mixture of aminoethylpiperazine and polyoxyalkylenepolyamine in an amount which is balanced to give the maximum level of primary amine reaction without yielding an excessively viscous reaction product. The prereacted product is reacted with a curing amount of a polyoxyalkylene polyamine and an accelerator.

U.S. Pat. No. 3,875,072 to H. G. Waddill teaches an accelerator for curing epoxy resins. The accelerator comprises piperazine and an alkanolamine in a weight ratio of 1:8 to 1:1. A number of alkanolamines are taught. U.S. Pat. No. 4,195,153 to H. G. Waddill teaches an epoxy resin curing accelerator comprising a mixture of N-aminoethylpiperazine (AEP) and triethanolamine (TEA). U.S. Pat. No. 4,189,564 to H. G. Waddill teaches a non-crystallizing accelerator for curing epoxy resins. The accelerator comprises a mixture of 10 to 20% piperazine, 5 to 10% N-aminoethylpiperazine and 65 to 80% triethanolamine. The accelerator is sold commercially as Accelerator 399 by Texaco Chemical Co. The accelerator is said to be synergistic for accelerating the curing of a polyglycidyl ether of a polyhydric phenol cured with a polyoxyalkylene polyamine at ambient or elevated temperatures. Such amines include polyoxypropylene diamines of the formula:

$$NH_2CH(CH_3)CH_2[OCH_2CH(CH_3)]_xNH_2$$

wherein x ranges from 2 to 40. Such amines also include polyoxypropylene triamines of the formula:

$$R-C\begin{array}{l}CH_2[OCH_2CH(CH_3)]_xNH_2\\-CH_2[OCH_2CH(CH_3)]_yNH_2\\CH_2[OCH_2CH(CH_3)]_zNH_2\end{array}$$

wherein R is a lower alkyl and x+y+z ranges from 3 to 40.

These diamines and triamines may be synthesized according to U.S. Pat. No. 3,654,370 to E. L. Yeakey which teaches a method comprising a nickel, copper and chromium catalyst for aminating polyols.

U.S. Pat. No. 3,236,895 to J. M. Lee and J. C. Winfrey and U.S. Pat. No. 3,462,393 to Legler are pioneer patents. They describe a series of amine compounds which are solids or liquids and having utility particularly in curing epoxy resins. The amine compounds have the general formula:

$$\begin{array}{l}R_3\quad R_2\qquad R_2\\|\quad\;\;|\qquad\;\;|\\N-(C-(R_1)_m-C-N)_x-R_6\\|\quad\;\;|\qquad\;\;|\\R_4\quad R_2\qquad R_2\end{array}$$

wherein R's ae selectively defined as hydrogen, alkyl radicals and alkylene oxide radicals and x and m are defined integers.

SUMMARY OF THE INVENTION

The invention is an epoxy resin coating composition. The epoxy component comprises a mixture of an aromatic vicinal polyepoxide containing at least 1.8 reactive 1,2-epoxy groups per molecule and an acrylate ester in a weight ratio of 2:1 to 10:1. The curative component comprises a curing amount of a polyether polyamine. The curative additionally comprises a piperazine accelerator in molar equivalence with the acrylate ester.

The two components are reacted and cured to form an attractive coating free of surface blush and blemishes.

DESCRIPTION OF THE PREFERRED EMBODIMENTS

The invention is an improvement in U.S. Pat. No. 4,051,195 to W. R. McWhorter, incorporated herein by reference.

An improved epoxy formulation has been developed which cures rapidly to form attractive, blemish-free, blush-free coatings. The formulation comprises a blend of an aromatic-containing epoxy resin and an acrylate ester, cured with a mixture of polyether polyamine and a reactive amine accelerator derived from piperazine.

It has been found that the addition of piperazine to an acrylate ester-epoxy resin system comprising aromatics, shortened drying time and promoted rapid curing of the epoxy resin with the selected polyether polyamines demonstrated in the Example.

The vicinal polyepoxide containing compositions which may be cured with the products of the invention are aromatic organic materials having an average of at least 1.8 reactive 1,2-epoxy groups per molecule. These polyepoxide materials can be monomeric or polymeric, mono-aromatic or heterocyclic, and may be substituted if desired with other substituents besides the epoxy groups, e.g., hydroxyl groups, ether radicals, aromatic halogen atoms and the like. These vicinal polyepoxide containing compounds typically are of an epoxy equivalent weight of 150 to 250. Preferably the base resin, which has an epoxide equivalent weight of from 175 to 195, is derived from condensing epichlorohydrin with 2,2-bis(p-hydroxyphenyl propane) to form 2,2-bis[p-2,3 epoxy propoxy)phenyl]propane, a derivative of bisphenol A.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolac, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. Typicaklly the epoxy resins have an average of at least 1.8 reactive, 1,2-epoxy groups per molecule. An illustrative, but by no means exhaustive, listing of suitable dihydric phenols includes 4,4'-isopropylidene bisphenol, 2,4'-dihydroxydiphenylethyl methane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides which can be cured by the products of the invention in accordance with the present invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The acrylate esters useful in this invention are those esters which contain more than one terminal acrylate or methacrylate group. These esters include the acrylic and methacrylic acid esters of aliphatic polyhydric alcohols such as, for example, the di- and polyacrylates and the di- and polymethacrylates of alkylene glycols, alkoxylene glycols, alicyclic glycols and higher polyols, such as ethylene glycol, triethylene glycol, tetraethylene glycol, tetramethylene glycol, hexanediol, trimethylolethane, trimethylolpropane, pentaerythrtiol, dipentaerythritol, tripentaerythritol and the like, or mixtures of these with each other or with their partially esterified analogs.

Typical compounds include but are not limited to trimethylolpropane triacrylate, trimethylolethane triacrylate, trimethylolpropane trimethacrylate, trimethylolethane trimethacrylate, tetramethylene glycol dimethacrylate, ethylene glycol dimethyacrylate, triethylene glycol dimethacrylate, pentaerythritol triacrylate, pentaerythritol tetraacrylate, 1,6-hexanediol diacrylate, 1,6-hexanediol dimethacrylate, dipentaerythritol tetraacrylate, dipentaerythritol pentaacrylate, and the like. Particularly preferred esters are 1,6-hexanediol diacrylate, trimethylolpropane triacrylate, pentaerythritol triacrylate, and pentaerythritol tetraacrylate.

The procedures for preparing these acrylate and methacrylate esters of epoxide resins is described in U.S. Pat. No. 3,377,406 incorporated by reference.

The acrylate or methacrylate esters are blended with the polyepoxide resin in the weight ratio of about 5 to about 100 parts of ester for each 100 parts of resin.

Of the amine curing agents known to be effective in curing a vicinal epoxy resin, preferred curing agents in accordance with the instant invention are the polyoxyalkylene containing amine compounds. A preferred class of polyoxyalkylene polyamines is of the formula:

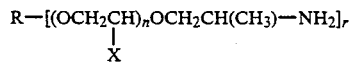

wherein X is hydrogen, methyl or ethyl radical; R is the nucleus of an oxyalkylation susceptible polyhydric alcohol containing 2 to 12 carbon atoms and 2 to 8 hydroxyl groups; n is a number ranging from 1 to about 15 and r is a number ranging from 2 to 4.

The most preferred polyoxyalkylene polyamines are a polyoxypropylene diamine having a molecular weight of about 230 or a triamine of molecular weight about 400. These products are available under the tradename JEFFAMINE® D-230 and JEFFAMINE® T-403 from Texaco Chemical Co. Their use as curing agents is described in U.S. Pat. No. 4,189,564.

JEFFAMINE® D-230 is represented by the formula:

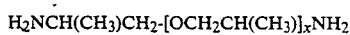

wherein x averages 2.6.

JEFFAMINE® T-403 is represented by the formula:

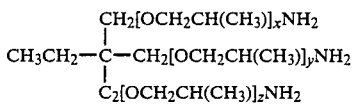

wherein x+y+z averages 5.3.

The reactive amine accelerators of the instant invention are piperazine compounds which are described, for example, in U.S. Pat. No. 3,875,072 and U.S. Pat. No. 4,528,345 to Waddill incorporated herein by reference. The preferred accelerator is piperazine itself. N-aminoethylpiperazine is also shown in the Example to produce good coatings.

The piperazine compound is incorporated in an amount which will ensure a maximum level of primary amine reaction but give a reaction product which is not too viscous to handle. The greater the ratio of accelerator to acrylate ester, the less primary amine is reacted. However, a large excess of epoxy resin will result in a very viscous product or even a gel which is undesirable. However, excess piperazine compound is undesirable because of extraneous reactions. Accordingly, the instant coatings are formulated with piperazine compound in an approximate equivalence with the acrylate ester.

This invention is shown by way of Example.

EXAMPLE 1
Coating Properties: Liquid Epoxy Resin/TMP Triacrylate cured with JEFFAMINE ® T-403/Piperazine Systems

| Formulation, pbw | 6253-68C | 6213-92B | 6213-92A | 6253-68A | 6253-68B |
|---|---|---|---|---|---|
| Epoxy resin[1] | 100 | 90 | 90 | 80 | 70 |
| TMPTA[6] | — | 10 | 10 | 20 | 30 |
| JEFFAMINE ® T-403 | 42 | 47 | 38.9 | 34.6 | 30.3 |
| Piperazine | — | — | 4.4 | 8.8 | 13.2 |
| Solvent[2] | 15.7 | 16.4 | 15.9 | 15.9 | 15.9 |
| Leveling agent[3] | 1.4 | 1.5 | 1.4 | 1.4 | 1.4 |
| Coating Properties | | | | | |
| Drying time, 6 mil film | | | | | |
| Set-to-touch, hrs | 11.8 | 7.7 | 6.1 | ~0.5 | ~0.5 |
| Surface-dry, hrs | 17.8 | 11.7 | 9.4 | 0.5 | ~0.5 |
| Thru-dry, hrs | 21.9 | 18.7 | 13.9 | ~18 | 0.5 |
| Pencil hardness after: | | | | | |
| 24 hrs, ~25° C. | F[5] | H[4] | H[4] | 2B[4,5] | 2B[4,5] |
| 48 hrs, ~25° C. | F[5] | F[5] | F[5] | HB[5] | B[5] |
| 72 hrs, ~25° C. | H[5] | H[5] | H[5] | H[5] | H[5] |
| 7 days, ~25° C. | H[5] | H[5] | H[5] | H[5] | H[5] |
| 24 hrs ~25° C., 1 hr 80° C. 1 hr 125° C. | H[5] | H[5] | H[5] | H[5] | H[5] |
| Gardner impact, in-lbs to fail after: (dir./rev.) | | | | | |
| 24 hrs, ~25° C. | 28/12 | ← >160/>160 → | | | |
| 48 hrs, ~25° C. | 24/<4 | 140/160 | 120/36 | ← >160/>160 → | |
| 72 hrs, ~25° C. | 28/<4 | 72/68 | 48/32 | 160/152 | >160/>160 |
| 7 days, ~25° C. | 20/<4 | 80/~100 | 56/48 | 28/16 | >160/52 |
| 24 hrs ~25° C., 1 hr 80° C. 1 hr 125° C. | 96/48 | 156/>160 | >160/>160 | 120/108 | >160/144 |

[1] Liquid epoxy resin of Bisphenol A-type; epoxy equivalent weight ~185.
[2] 50:50 pbw of n-butanol/ethanol mixture.
[3] Beetle 216-8; American Cyanamid Co.
[4] Coating indented without permanent marring with softer lead.
[5] High gloss surface without blemishes.
[6] TMPTA = triethylolpropane triacrylate.

Drying of thin films of epoxy resin cured with JEFFAMINE ® T-403 was quite slow. Addition of TMP triacrylate resulted in slight improvement in drying time. Combination of epoxy/acrylate with polyetheramine/reactive amine (piperazine) resulted in significant improvement. Larger amounts of acrylate combined with equivalent amounts of reactive amine produced a rapid drying coating with improved flexibility that was free of blush and blemishes.

EXAMPLE 2
Coating Properties: Curing Liquid Epoxy Resin/TMPTA Blends cured with JEFFAMINE ® T-403, Other More Reactive Amines

| Formulation: | 6253-11A | 6213-92B | 6213-92A | 6253-5A | 6253-5B | 6253-5C | 6253-5D | 6253-11B | 6253-11C | 6253-11D |
|---|---|---|---|---|---|---|---|---|---|---|
| Epoxy resin[1] | 100 | 90 | 90 | 90 | 90 | 90 | 90 | 90 | 90 | 90 |
| TMP triacrylate | — | 10 | 10 | 10 | 10 | 10 | 10 | 10 | 10 | 10 |
| JEFFAMINE ® T-403 | 42 | 47 | 38.9 | 38.9 | 38.9 | 38.9 | 38.9 | 38.9 | 38.9 | 38.9 |
| Piperazine | — | — | 4.4 | — | — | — | — | — | — | — |
| Triethylenetetramine | — | — | — | 2.5 | — | — | — | — | — | — |
| N—aminoethylpiperazine | — | — | — | — | 4.4 | — | — | — | — | — |
| Isophoronediamine | — | — | — | — | — | 4.3 | — | — | — | — |
| 1,2-Diaminocyclohexane | — | — | — | — | — | — | 2.9 | — | — | — |
| Bis(aminopropyl) | — | — | — | — | — | — | — | 5.1 | — | — |

EXAMPLE 2
Coating Properties: Curing Liquid Epoxy Resin/TMPTA Blends cured with JEFFAMINE ® T-403, Other More Reactive Amines

| | 6253- | 6213- | | | | | | 6253- | | |
|---|---|---|---|---|---|---|---|---|---|---|
| Formulation: | 11A | 92B | 92A | 5A | 5B | 5C | 5D | 11B | 11C | 11D |
| piperazine | — | — | — | — | — | — | — | — | — | — |
| Bis(aminoethyl) ether | — | — | — | — | — | — | — | — | — | 2.6 |
| Methyliminobis(propyl-amine | — | — | — | — | — | — | — | — | 3.7 | — |
| Solvent[2] | 14.2 | 16.4 | 15.9 | 14.2 | 14.4 | 14.4 | 14.2 | 14.4 | 14.2 | 14.2 |
| Leveling agent[3] | 1.4 | 1.5 | 1.4 | 1.4 | 1.4 | 1.4 | 1.4 | 1.4 | 1.4 | 1.4 |
| Coating Properties | | | | | | | | | | |
| Drying time, 6 mil film | | | | | | | | | | |
| Set-to-touch, hrs | 9.8 | 7.7 | 6.1 | 5.5 | 5.2 | 6.4 | 6.1 | 5.5 | 6.7 | 7.0 |
| Surface-dry, hrs | 17.8 | 11.7 | 9.4 | 8.0 | 7.4 | 9.4 | 8.9 | 9.0 | 11.1 | 12.4 |
| Thru-dry, hrs | 20.2 | 18.7 | 13.9 | 17.4 | 11.1 | 13.8 | 17.2 | 15.5 | 15.7 | 16.5 |
| Pencil hardness after: | | | | | | | | | | |
| 24 hrs, ~25° C. | H[4] | H[4] | H[4] | 2B | B | 2B | 2B | H[4] | H[4] | H[4] |
| 48 hrs, ~25° C. | F-H | F[7] | F[7] | HB[5] | H[7] | F[7] | F[7] | F | H | H |
| 72 hrs, ~25° C. | H | H[7] | H[7] | H | H[7] | H[7] | H[7] | H | H | H |
| 7 days, ~25° C. | H | H[7] | H[7] | H[5 6] | H[7] | H[7] | H[7] | H | H | H |
| 24 hrs ~25° C., 1 hr 80° C., 1 hr 125° C. | H | H[7] | H[7] | H[6] | H[7] | H[7] | H[7] | H | H | H |
| Gardner impact, in-lbs to fail after: (dir./rev.) | | | | | | | | | | |
| 24 hrs, ~25° C. | 24/8 | ←>160/>160→ | | | | 20/<4 | | ←>160/>160→ | | |
| 48 hrs, ~25° C. | 20/<4 | 140/160 | 120/136 | ~60/64 | 40/20 | 16/<4 | 68/40 | 132/40 | 36/40 | >160/80 |
| 72 hrs, ~25° C. | 24/<4 | 72/68 | 48/32 | 40/20 | 36/12 | 12/<4 | 32/8 | 68/20 | 48/16 | 60/40 |
| 7 days, ~25° C. | 32/<4 | 80/~100 | 56/48 | 36/16 | 32/12 | 48/8 | 48/8 | 36/<4 | 32/16 | 60/24 |
| 24 hrs ~25° C., 1 hr 80° C., 1 hr 125° C. | 136/92 | 156/>160 | >160/>160 | 160/80 | >160/120 | 160/88 | >160/>160 | 160/152 | 160/132 | 160/160 |

[1]Liquid diglycidyl ether of Bisphenol A; equiv. wt ~185.
[2]50:50 mixture of n-butanol/ethanol.
[3]Beetle 216-8; American Cyanamid Co.
[4]Coating indented without permanent marring with softer lead.
[5]Light blush.
[6]Blemished surface.
[7]High gloss; unblemished surface.

Comparison of solvent-based cured with JEFFAMINE® T-403 and a variety of more reactive amines indicated that drying time were improved with partial substitution of a more reactive amine for the polyetheramine (JEFFAMINE® product). A number of the reactive amines resulted in improved drying time but also resulted in blushed, blemished or imperfect surfaces. Reactive amines that speeded curing and did not impair surface properties were piperazine, AEP and isophoronediamine.

EXAMPLE 3
Coating Properties: Liquid Epoxy Resin/TMPTA Triacrylate Blend cured with JEFFAMINE ® T-403/Other Amine Blend

| | 6253- | | | | | | | | |
|---|---|---|---|---|---|---|---|---|---|
| Formulation: | 70A | 68A | 70C | 70B | 70D | 71D | 71B | 71C | 71A |
| Epoxy resin[1] | 80 | 80 | 80 | 80 | 80 | 80 | 80 | 80 | 80 |
| TMP triacrylate | 20 | 20 | 20 | 20 | 20 | 20 | 20 | 20 | 20 |
| JEFFAMINE® T-403 | 50.8 | 34.6 | 34.6 | 34.6 | 34.6 | 34.6 | 34.6 | 34.6 | 34.6 |
| Piperazine | — | 8.8 | — | — | — | — | — | — | — |
| Triethylenetetramine | — | — | 4.9 | — | — | — | — | — | — |
| N—aminoethylpiperazine | — | — | — | 8.7 | — | — | — | — | — |
| Isophoronediamine | — | — | — | — | 8.6 | — | — | — | — |
| 1,2-Diaminocyclohexane | — | — | — | — | — | 5.8 | — | — | — |
| Bis(aminopropyl)piperazine | — | — | — | — | — | — | 10.1 | — | — |
| Bis(aminoethyl)ether | — | — | — | — | — | — | — | 5.3 | — |
| Methyliminobis(propylamine) | — | — | — | — | — | — | — | — | 7.3 |
| Solvent[2] | — | 15.9 | — | — | — | — | — | — | — |
| Leveling agent[3] | — | 1.4 | — | — | — | — | — | — | — |
| Coating Properties | | | | | | | | | |
| Drying time, 6 mil film | | | | | | | | | |
| Set-to-touch, hrs | 11.4 | ~0.5 | 3.3 | 4.2 | 11.4 | 7.4 | 7.9 | 4.7 | 3.2 |
| Surface-dry, hrs | 12.4 | 0.5 | 4.9 | 5.1 | 12.3 | 8.6 | 10.5 | 5.6 | 4.3 |
| Thru-dry, hrs | 22.6 | ~18 | 16.9 | 12.2 | 26.8 | 16.5 | 13.4 | 9.2 | 12.4 |
| Pencil hardness after: | | | | | | | | | |
| 24 hrs, ~25° C. | >3B[4 5] | 2B[5 6] | 3B[7 5] | F[6 5] | 3B[7 5] | 2B[8] | HB[8] | 2B[8] | HB[8] |
| 48 hrs, ~25° C. | H[5 6] | H[5] | HB[10] | HB-F[5] | F[5] | HB[8] | HB[8 10] | HB[8] | H[8] |
| 72 hrs, ~25° C. | H[5] | H[5] | HB[9 10] | H[5] | F[5] | F[8] | HB[8 10] | F[8] | H[8] |

EXAMPLE 3
Coating Properties: Liquid Epoxy Resin/TMPTA Triacrylate Blend cured with JEFFAMINE® T-403/Other Amine Blend

| Formulation: | 6253- | | | | | | | | |
|---|---|---|---|---|---|---|---|---|---|
| | 70A | 68A | 70C | 70B | 70D | 71D | 71B | 71C | 71A |
| 7 days, ~25° C. | F-H[5] | H[5] | F-H[9] [10] | H[5] | H[5] | H[8] | H[8] | H[8] | H[8] |
| 24 hrs ~25° C., 1 hr 80° C., 1 hr 125° C. | H[5] | H[5] | H[9] | H[5] | H[5] | H[8] | F[11] | H[8] | H[8] |
| Gardner impact, in-lbs to fail after: (dir/rev.) | | | | | | | | | |
| 24 hrs, ~25° C. | | | | | ←—>160/>160—→ | | | | |
| 48 hrs, ~25° C. | | | | | ←—>160/>160—→ | | | | >160/76 |
| 72 hrs, ~25° C. | >160/>160 | 160/152 | ~160/104 | ~160/60 | 140/48 | 160/100 | >160/>160 | >160/>160 | 148/48 |
| 7 days, ~25° C. | >160/>160 | 28/16 | 40/28 | 140/36 | 48/16 | 40/8 | 148/80 | >160/112 | 44/20 |
| 24 hrs ~25° C., 1 hr 80° C., 1 hr 125° C. | >160/>160 120/108 | 136/104 | 160/156 | 156/160 | 160/112 | >160/144 | 152/>160 | 160/>160 | |

[1] Liquid diglycidyl ether of Bisphenol A.
[2] 50:50 mixture of n-butanol/ethanol.
[3] Beetle 216-8; American Cyanamid Co.
[4] Tacky surface.
[5] High gloss surface without blemishes.
[6] Indented without marring with softer lead.
[7] Slightly tacky surface.
[8] Blemished surface.
[9] Dull, blemished surface.
[10] Blushed surface.
[11] Satin, dulled surface.

The reactive amines speeded gellation of the epoxy/acrylate thin film. However, many of the reactive amines also produced blushed, blemished coatings. Only three did not—piperazine, AEP and isophoronediamine (IPDA). The IPDA-containing formulation dried slowly, much more so thant did a similar formulation containing an alcohol solvent (Example 2). The presence of solvent was found beneficial for some formulations. The reactive amines with best overall properties were piperazine and AEP.

TABLE OF TEST METHODS

| Pencil hardness (cure) | ASTM D-3363-74 |
|---|---|
| Gardner impact | ASTM D-2794-69 |

While particular embodiments of the invention have been described, it is well understood that the invention is not limited thereto since modifications may be made. It is therefore contemplated to cover by the appended claims any such modifications as fall within the spirit and scope of the claims.

What is claimed is:

1. An epoxy resin coating composition comprising the cured reaction product of:
   1. an aromatic vicinal polyepoxide having at least 1.8 reactive 1,2-epoxy groups per molecule, mixed with an acrylate ester which contains more than one terminal acrylate or methacrylate group in a weight ratio of polyepoxide:acrylate ester of 2:1 to 10:1; reacted with
   2. a curing amount of polyether polyamine of the formula:

$$NH_2CH(CH_3)CH_2[OCH_2CH(CH_3)]_xNH_2$$

wherein x ranges from 2 to 6; mixed with piperazine, N-aminoethylpiperazine or a mixture thereof in approximately molar equivalence with the acrylate ester.

2. The coating composition of claim 1 wherein the acrylate ester is trimethylolpropane triacrylate.

3. The coating composition of claim 1 wherein the aromatic vinical polyepoxide is a bisphenol A resin.

4. The coating composition of claim 1 wherein the polyepoxide:acrylate ester weight ratio is 10:3 to 10:2.

5. An epoxy resin coating composition comprising the cured reaction product of:
   1. an aromatic vicinal polyepoxide having at least 1.8 reactive 1,2-epoxy groups per molecule, mixed with an acrylate ester which contains more than one terminal acrylate or methacrylate group in a weight ratio of polyepoxide:acrylate ester of 2:1 to 10:1; reacted with
   2. a curing amount of a polyether polyamine of the formula:

$$\begin{array}{c} CH_2[OCH_2CH(CH_3)]_xNH_2 \\ | \\ CH_3CH_2-C-CH_2[OCH_2CH(CH_3)]_yNH_2 \\ | \\ CH_2[OCH_2CH(CH_3)]_zNH_2 \end{array}$$

wherein x+y+z ranges from 4 to 6; mixed with piperazine, N-aminoethylpiperazine or a mixture thereof in approximately molar equivalence with the acrylate ester.

6. The coating composition of claim 5 wherein the acrylate ester is trimethylolpropane triacrylate.

7. The coating composition of claim 5 wherein the aromatic vicinal polyepoxide is a bisphenol A resin.

8. The coating composition of claim 5 wherein the polyepoxide:acrylate ester weight ratio is 10:3 to 10:2.

9. An epoxy resin coating composition comprising the cured reaction product of:
   1. an aromatic vicinal polyepoxide having at least 1.8 reactive 1,2-epoxy groups per molecule, mixed with a triacrylate in a weight ratio of polyepoxide:triacrylate of 10:3 to 10:2; reacted with 2. a curing amount of a polyether polyamine of the formula $NH_2CH(CH_3)CH_2[OCH_2CH(CH_3)]_xNH_2$ wherein x ranges from 2 to 6; mixed with piperazine in approximate molar equivalence with the triacrylate.

10. An epoxy resin coating composition comprising the cured reaction product of:

1. an aromatic vicinal polyepoxide having at least 1.8 reactive 1,2-epoxy groups per molecule, mixed with a triacrylate in a weight ratio of polyepoxide:-triacrylate of 10:3 to 10:2; reacted with 2. a curing amount of a polyether polyamine of the formula:

$$\begin{array}{c} CH_2[OCH_2CH(CH_3)]_xNH_2 \\ | \\ CH_3CH_2-C-CH_2[OCH_2CH(CH_3)]_yNH_2 \\ | \\ CH_2[OCH_2CH(CH_3)]_zNH_2 \end{array}$$

wherein x+y+z ranges from 4 to 6; mixed with piperazine in approximate molar equivalence with the triacrylate.

11. The coating composition of claim 1 wherein the acrylate ester is a triacrylate or polyacrylate.

12. The coating composition of claim 1 wherein the acrylate ester is a triacrylate, tetraacrylate or pentaacrylate.

13. The coating composition of claim 1 wherein the acrylate ester is a triacrylate.

14. The coating composition of claim 5 wherein the acrylate ester is a triacrylate or polyacrylate.

15. The coating composition of claim 5 wherein the acrylate ester is a triacrylate, tetraacrylate or pentaacrylate.

16. The coating composition of claim 5 wherein the acrylate ester is a triacrylate.

17. The coating composition of claim 9 wherein the triacrylate is trimethylolpropane triacrylate.

18. The coating composition of claim 10 wherein the triacrylate is trimethylolpropane triacrylate.

* * * * *